(12) United States Patent
Kikui

(10) Patent No.: US 7,127,060 B1
(45) Date of Patent: Oct. 24, 2006

(54) SUBSCRIBER CIRCUIT

(75) Inventor: Hideki Kikui, Tokyo (JP)

(73) Assignee: NEC Corporation, Tokyo (JP)

( * ) Notice: Subject to any disclaimer, the term of this patent is extended or adjusted under 35 U.S.C. 154(b) by 1010 days.

(21) Appl. No.: 09/592,915

(22) Filed: Jun. 13, 2000

(30) Foreign Application Priority Data

Jun. 14, 1999 (JP) ................................ 11-166706

(51) Int. Cl.
*H04M 3/22* (2006.01)
(52) U.S. Cl. .................................. 379/387; 379/399.01
(58) Field of Classification Search ........... 379/387.01, 379/377, 399.01, 413, 413.01, 418
See application file for complete search history.

(56) References Cited

U.S. PATENT DOCUMENTS

| | | | |
|---|---|---|---|
| 3,865,992 A * | 2/1975 | Bouty et al. ................. | 379/379 |
| 3,941,939 A * | 3/1976 | Holmes et al. ............. | 379/252 |
| 4,007,335 A * | 2/1977 | Hetherington et al. ...... | 379/413 |
| 4,277,648 A * | 7/1981 | Glassman .................... | 379/111 |
| 4,521,643 A | 6/1985 | Dupuis et al. ................. | 179/2 |
| 5,528,682 A * | 6/1996 | Cotreay ....................... | 379/377 |

FOREIGN PATENT DOCUMENTS

| | | |
|---|---|---|
| JP | 59-128855 | 7/1984 |
| JP | 61-57166 | 3/1986 |

* cited by examiner

*Primary Examiner*—Sinh Tran
*Assistant Examiner*—Walter F Briney, III
(74) *Attorney, Agent, or Firm*—Foley & Lardner LLP

(57) ABSTRACT

A subscriber circuit, provided with a feeding circuit for feeding the current of a call to a terminal through a subscriber line and a switching circuit group for connecting the feeding circuit to the subscriber line and releasing the feeding circuit from the subscriber line, for controlling feeding to the terminal, comprising: said feeding circuit monitoring the state of a loop of the subscriber line, converting a two-wire signal sent from the terminal into a signal predetermined coefficient-fold, and supplying the same; a level converter, connected to the subscriber line through said switching circuit group, for converting a two-wire signal sent from the terminal into a signal any coefficient-fold and supplying the same, separately from said feeding circuit; and a signal monitor for monitoring a signal, using one of an output signal of said feeding circuit and an output signal of said level converter, according to upper control information and the output of monitoring the loop of said feeding circuit, and supplying signal monitor information.

8 Claims, 2 Drawing Sheets

SUBSCRIBER CIRCUIT

BACKGROUNDS OF THE INVENTION

1. Field of the Invention

The present invention relates to a subscriber circuit, provided with a feeding circuit and a switching circuit group, for controlling feeding to a terminal of a telephone subscriber, and more particularly, it relates to a subscriber circuit provided with a signal monitoring function for monitoring a signal transferred through a subscriber line.

2. Description of the Related Art

Generally a voice signal for telephone call has been transferred to a telephone subscriber line, as well as a signal including predetermined information such as detection of the hook with the signal superimposed on the voice signal.

In the conventional technique, a signal monitor for the exclusive purpose is provided in order to monitor this kind of signal transferred through a subscriber line. As this kind of the conventional signal monitor, there is, for example, a device disclosed in Japanese Patent Publication Laid-Open (Kokai) No. Showa 59-128855. The conventional signal monitor circuit disclosed in the same publication comprises a high impedance dc buffer connected to a subscriber line at high input impedance, a hook detecting device for detecting the state of a hook of a subscriber line through the output of the high impedance dc buffer, and a pilot sound detecting device for monitoring a pilot sound in reply to the hook detecting device.

The conventional signal monitor is designed to monitor a signal transferred from a terminal through a subscriber line, and therefore, it is able to monitor a signal only when the terminal thereof is connected to a feeding circuit and the feeding circuit is feeding the power. When the terminal side is on the hook and the subscriber line stops feeding the current of a call, or when the feeding circuit is released from the subscriber line, it cannot monitor a signal.

The above-mentioned conventional signal monitoring technique, however, must be provided with a device for the exclusive use for monitoring a signal, and therefore, the system is increased in size and it becomes complicated, which is not economical.

This is because the pilot sound monitor owes the signal monitor of a subscriber line and the high input impedance dc buffer and the hook detecting device owe the detection of the hook of a subscriber line.

In the conventional signal monitor, the high input impedance dc buffer, that is one of the components, needs to have high input impedance, which produces such ill effects that the level of a call is deviated, echoes increase, and the like.

This is because the terminal impedance in a subscriber line is deviated. Namely, since a telephone signal terminates at constant terminal impedance at the time of a telephone call, it produces little effect on the call logically if terminal impedance<<dc buffer. Actually, since even the high-input impedance has limited value, it is impossible to be completely free from ill effect, but deviation of the terminal impedance in the subscriber line will produce some effect on the call.

The conventional signal monitor cannot monitor a signal of a subscriber line when the feeding circuit stops feeding and the feeding circuit is cut off from the subscriber line. Therefore, for example, when reversing the feeding polarity of a subscriber, since the feeding circuit is stopped and the feeding circuit is once cut off from the subscriber line, the signal monitor becomes impossible.

SUMMARY OF THE INVENTION

In order to solve the above problems, an object of the present invention is to provide a subscriber circuit capable of realizing miniaturization of a system by monitoring a signal of a subscriber line instead of using a device of the exclusive use, and capable of monitoring a signal of a subscriber line even when a feeding circuit stops feeding and it is cut off from a subscriber line.

According to one aspect of the invention, a subscriber circuit, provided with a feeding circuit for feeding current of a call to a terminal through a subscriber line and a switching circuit group for connecting the feeding circuit to the subscriber line and releasing the feeding circuit from the subscriber line, for controlling feeding to the terminal, comprises the feeding circuit monitoring state of a loop of the subscriber line, converting a two-wire signal sent from the terminal into a signal predetermined coefficient-fold, and supplying the same, a level converter, connected to the subscriber line through the switching circuit group, for converting a two-wire signal sent from the terminal into a signal any coefficient-fold and supplying the same, separately from the feeding circuit, and a signal monitor means for monitoring a signal, using one of an output signal of the feeding circuit and an output signal of the level converter, according to upper control information and the output of monitoring the loop of the feeding circuit, and supplying signal monitor information.

Since in the present invention constituted in the above, a monitoring function of a subscriber line in a loop shape is provided in a subscriber circuit including a feeding circuit, it is necessary to perform the hook monitor of the subscriber line by the device for the exclusive use; the high input impedance dc buffer and the hook detecting device.

Since the present invention is provided with a control circuit for controlling a switching circuit group, a feeding circuit and a level converter, according to the upper level control information and the state of a loop of the feeding circuit, signal monitor of a subscriber line is possible even when a subscriber circuit stops feeding the current of a call with a terminal on-hook and even when the feeding circuit is released from the subscriber line.

In the preferred construction, the signal monitor means includes a signal output circuit for receiving the output signal of the feeding circuit and the output signal of the level converter and supplying one of the signals, a wave filter for filtering the output signal of the signal output circuit, a signal monitor for monitoring a signal based on the output signal of the wave filter and supplying signal monitor information, and a control circuit for controlling connection and disconnection by the switching circuit group, output of the feeding circuit, output of the level converter, and operation of the signal output circuit, depending on the operation, according to the upper control information and the loop monitoring output of the feeding circuit.

In another preferred construction, the signal monitor means includes a wave filter for filtering the output signal of the feeding circuit and the output signal of the level converter, a signal output circuit for receiving the output signal of the feeding circuit and the output signal of the level converter filtered through the wave filter, and supplying one of the signals, a signal monitor for monitoring a signal according to the output signal of the signal output circuit and supplying the signal monitor information, and a control circuit for controlling connection and disconnection by the switching circuit group, output of the feeding circuit, output of the level converter, and operation of the signal output circuit, depending on the operation, according to the upper control information and the loop monitoring output of the feeding circuit.

In another preferred construction, the coefficient used for the feeding circuit converting the two-wire signal into a signal coefficient-fold is identical to the coefficient used for the level converter converting the two-wire signal into a signal coefficient-fold.

In another preferred construction, the signal monitor means includes a signal output circuit for receiving the output signal of the feeding circuit and the output signal of the level converter and supplying one of the signals, a wave filter for filtering the output signal of the signal output circuit, a signal monitor for monitoring a signal based on the output signal of the wave filter and supplying signal monitor information, and a control circuit for controlling connection and disconnection by the switching circuit group, output of the feeding circuit, output of the level converter, and operation of the signal output circuit, depending on the operation, according to the upper control information and the loop monitoring output of the feeding circuit, and the coefficient used for the feeding circuit converting the two-wire signal into a signal coefficient-fold is identical to the coefficient used for the level converter converting the two-wire signal into a signal coefficient-fold.

In another preferred construction, the signal monitor means includes a wave filter for filtering the output signal of the feeding circuit and the output signal of the level converter, a signal output circuit for receiving the output signal of the feeding circuit and the output signal of the level converter filtered through the wave filter, and supplying one of the signals, a signal monitor for monitoring a signal according to the output signal of the signal output circuit and supplying the signal monitor information, and a control circuit for controlling connection and disconnection by the switching circuit group, output of the feeding circuit, output of the level converter, and operation of the signal output circuit, depending on the operation, according to the upper control information and the loop monitoring output of the feeding circuit, and the coefficient used for the feeding circuit converting the two-wire signal into a signal coefficient-fold is identical to the coefficient used for the level converter converting the two-wire signal into a signal coefficient-fold.

In another preferred construction, the feeding circuit is formed by a transistor.

In another preferred construction, the signal monitor means includes a signal output circuit for receiving the output signal of the feeding circuit and the output signal of the level converter and supplying one of the signals, a wave filter for filtering the output signal of the signal output circuit, a signal monitor for monitoring a signal based on the output signal of the wave filter and supplying signal monitor information, and a control circuit for controlling connection and disconnection by the switching circuit group, output of the feeding circuit, output of the level converter, and operation of the signal output circuit, depending on the operation, according to the upper control information and the loop monitoring output of the feeding circuit, and the feeding circuit is formed by a transistor.

In another preferred construction, the signal monitor means includes a wave filter for filtering the output signal of the feeding circuit and the output signal of the level converter, a signal output circuit for receiving the output signal of the feeding circuit and the output signal of the level converter filtered through the wave filter, and supplying one of the signals, a signal monitor for monitoring a signal according to the output signal of the signal output circuit and supplying the signal monitor information, and a control circuit for controlling connection and disconnection by the switching circuit group, output of the feeding circuit, output of the level converter, and operation of the signal output circuit, depending on the operation, according to the upper control information and the loop monitoring output of the feeding circuit, and the feeding circuit is formed by a transistor.

In another preferred construction,
a subscriber circuit is provided, in which
the coefficient used for the feeding circuit converting the two-wire signal into a signal coefficient-fold is identical to the coefficient used for the level converter converting the two-wire signal into a signal coefficient-fold, and
the feeding circuit is formed by a transistor.

In another preferred construction, the level converter is formed by a converter.

In another preferred construction, the signal monitor means includes a signal output circuit for receiving the output signal of the feeding circuit and the output signal of the level converter and supplying one of the signals, a wave filter for filtering the output signal of the signal output circuit, a signal monitor for monitoring a signal based on the output signal of the wave filter and supplying signal monitor information, and a control circuit for controlling connection and disconnection by the switching circuit group, output of the feeding circuit, output of the level converter, and operation of the signal output circuit, depending on the operation, according to the upper control information and the loop monitoring output of the feeding circuit, and the level converter is formed by a converter.

In another preferred construction, the signal monitor means includes a wave filter for filtering the output signal of the feeding circuit and the output signal of the level converter, a signal output circuit for receiving the output signal of the feeding circuit and the output signal of the level converter filtered through the wave filter, and supplying one of the signals, a signal monitor for monitoring a signal according to the output signal of the signal output circuit and supplying the signal monitor information, and a control circuit for controlling connection and disconnection by the switching circuit group, output of the feeding circuit, output of the level converter, and operation of the signal output circuit, depending on the operation, according to the upper control information and the loop monitoring output of the feeding circuit, and the level converter is formed by a converter.

In another preferred construction, the coefficient used for the feeding circuit converting the two-wire signal into a signal coefficient-fold is identical to the coefficient used for the level converter converting the two-wire signal into a signal coefficient-fold, and the level converter is formed by a converter.

In another preferred construction, the feeding circuit is formed by a transistor, and the level converter is formed by a converter.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
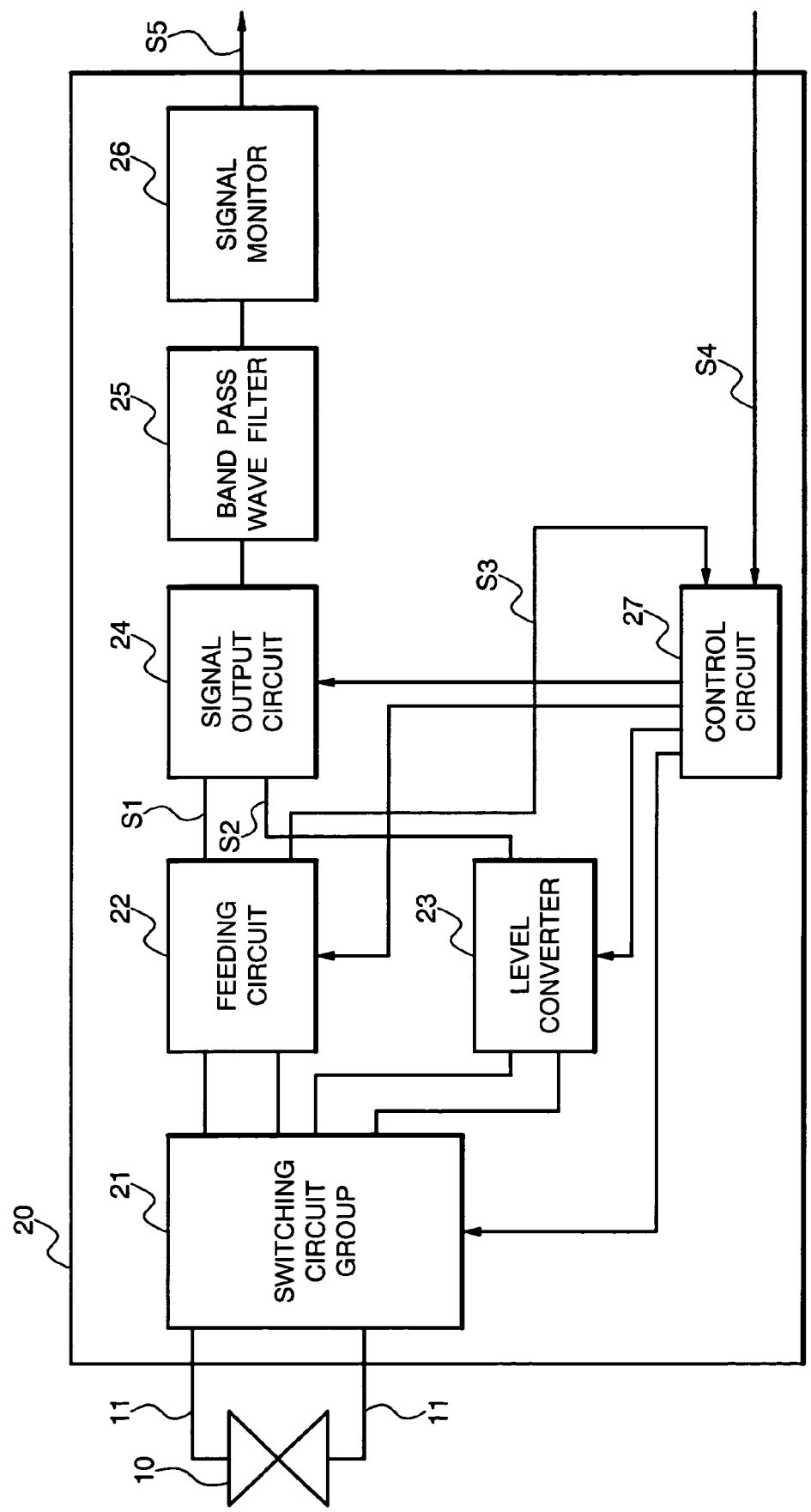
FIG. 1 is a block diagram showing the structure of a subscriber circuit according to an embodiment of the present invention.

FIG. 1 is a block diagram showing the structure of a subscriber circuit according to an embodiment of the present invention. With reference to FIG. 1, a subscriber circuit 20 of this embodiment comprises a feeding circuit 22 for feeding the current of a call to a terminal 10 through a subscriber line 11 and monitoring the loop state of the subscriber line, a switching circuit group 21 for connecting the feeding circuit 22 to the subscriber line 11 and releasing the feeding circuit 22 from the subscriber line 11, a level converter 23 for converting a two-wire signal sent from the terminal 10 connected to the subscriber line through the switching circuit group 21 into a signal any coefficient-fold, a signal output circuit 24 for receiving the signal obtained by multiplying the two-wire signal from the feeding circuit 22 by any coefficient and a level converted output signal of the level converter 23 and supplying one of them, a band pass wave filter 25 for filtering the output signal of the signal output circuit 24, a signal monitor 26 for monitoring the output signal of the band pass wave filter 25 and supplying the signal monitor information, and a control circuit 27 for controlling the switching circuit group 21, the feeding circuit 22, the level converter 23, and the signal output circuit 24, based on the upper control information and the output of monitoring the loop of the feeding circuit 22. FIG. 1 shows only the characteristic components of the embodiment, and the description of the other general components is omitted there.

In the above components, the switching circuit group 21 connects the feeding circuit 22 to the subscriber line 11 and releases the feeding circuit 22 from the subscriber line 11, and connects the level converter 23 to the subscriber line 11 and releases the level converter 23 from the subscriber line 11.

The feeding circuit 22 is formed by a transistor, for feeding the current of a call to the terminal 10 through the subscriber line 11. Further, monitoring the state of the loop of the subscriber line 11, the feeding circuit 22 supplies its result S3 to the control circuit 27, and supplies the two-wired coefficient-fold signal S1 obtained by multiplying the two-wire signal sent from the terminal 10 by a given coefficient to the signal output circuit 24. The coefficient used for converting the two-wire signal can be decided arbitrarily depending on the circuitry of the subscriber circuit.

The level converter 23 is formed by a converter, which is connected to the subscriber line 11 through the switching circuit group 21, so to supply the level converted signal S2 obtained by multiplying the two-wire signal sent from the terminal 10 by the predetermined coefficient, to the signal output circuit 24. The coefficient used for converting the two-wire signal can be decided arbitrarily depending on the circuitry of the subscriber circuit. Where, this coefficient is identical to the coefficient used in the feeding circuit 22 for converting the two-wire signal.

The signal output circuit 24 receives the two-wire coefficient-fold signal S1 from the feeding circuit 22 and the level converted signal S2 of the level converter 23 and supplies one of them to the band pass wave filter 25.

The band pass wave filter 25 filters the output signal of the signal output circuit 24 and supplies it to the signal monitor 26.

The signal monitor 26 compares the output signal of the band pass wave filter 25 with the predetermined reference level, and supplies the signal monitor information S5 depending on the comparison result.

The control circuit 27 receives the upper control information S4 and the loop monitoring result S3 of the feeding circuit 22, and based on them, controls the switching circuit group 21, the feeding circuit 22, the level converter 23, and the signal output circuit 24.

This time, the operation of this embodiment will be described separately when the terminal 10 is off/on hook and when the feeding circuit 22 is released from the subscriber line.

At first, the description will be made when the terminal 10 is off hook. At this time, the feeding circuit 22 supplies the current of a call to the terminal 10 and supplies the loop monitoring result S3 to the control circuit 27. Further, the feeding circuit 22 converts the two-wire signal sent from the terminal 10 into the predetermined coefficient-fold signal, so to supply the same to the signal output circuit 24.

The signal output circuit 24 supplies to the band pass wave filter 25, the two-wire coefficient-fold signal S1 supplied from the feeding circuit 22 according to the control information of the control circuit 27.

The band pass wave filter 25 filters the two-wire coefficient-fold signal S1 and supplies it to the signal monitor 26.

The signal monitor 26 compares the signal filtered through the band pass wave filter 25 with the predetermined reference level, and when the output of the band pass wave filter 25 is larger than the reference level, it supplies the signal monitor information S5.

In the above operation, the control circuit 27 permits the feeding circuit 22 to supply the current of a call to the terminal 10, and permits the switching circuit group 21 to connect the feeding circuit 22 to the subscriber line 11 as well as to release the level converter 23 from the subscriber line 11. Thus, since the level converter 23 is released from the subscriber line 11, this produces no ill effect on the transmission characteristic of an ordinary voice band signal in the terminal 10 and the two-wire coefficient-fold signal S1.

Next, the description will be made when the terminal 10 is on hook. At this time, since the current of a call is not supplied from the feeding circuit 22 to the terminal 10, the loop monitoring result S3 is not supplied to the control circuit 27. Since the feeding circuit 22 doesn't supply the current of a call to the terminal 10, it cannot convert the two-wire signal sent from the terminal 10 into the coefficient-fold one because of lack of the dynamic range.

The control circuit 27 controls the connection of the level converter 23 to the subscriber line 11.

The level converter 23 receives the two-wire signal sent from the terminal 10 through the switching circuit group 21, and supplies the level converted signal S2 obtained by multiplying the two-wire signal by the predetermined coefficient, to the signal output circuit 24.

The signal output circuit 24 supplies the level converted signal S2 from the level converter 23 to the band pass wave filter 25 according to the control information from the control circuit 27.

The band pass wave filter 25 filters the level converted signal S2 and supplies it to the signal monitor 26.

The signal monitor 26 compares the signal filtered by the band pass wave filter 25 with the predetermined reference level, and when the output of the band pass wave filter 25 is larger than the reference level, it supplies the signal monitor information S5.

In the above operation, the control circuit 27 controls the switching circuit group 21 to connect the feeding circuit 22 to the subscriber line 11 and to connect the level converter 23 to the subscriber line 11. Here, though the level converter 23 is connected to the subscriber line 11, the terminal 10 is on hook, and no transmission of the ordinary voice band signal is performed, thereby naturally producing no ill effect on the corresponding transmission.

This time, the description will be made when the feeding circuit 22 stops feeding the current of a call and the switching circuit group 21 releases the feeding circuit 22 from the subscriber line 11. At this time, the loop monitoring result S3 is not supplied from the feeding circuit 22 to the control circuit 27.

Since the feeding circuit 22 is in a state of no feeding of the call current and released from the subscriber line 11, it cannot convert the two-wire signal sent from the terminal 10 into the coefficient-fold one.

The control circuit 27 controls the connection of the level converter 23 to the subscriber line 11.

The level converter 23 receives the two-wire signal sent from the terminal 10 through the switching circuit group 21, and supplies the level converted signal S2 obtained by multiplying it by the predetermined coefficient, to the signal output circuit 24.

The signal output circuit 24 supplies the level converted signal S2 from the level converter 23 to the band pass wave filter 25, according to the control information from the control circuit 27.

The band pass wave filter 25 filters the level converted signal S2 and supplies it to the signal monitor 26.

The signal monitor 26 compares the signal filtered by the band pass wave filter 25 with the predetermined reference level, and when the output of the band pass wave filter 25 is larger than the reference level, it supplies the signal monitor information S5.

In the above operation, the control circuit 27 controls the feeding circuit 22 to stop feeding the current of a call to the terminal 10, and controls the switching circuit group 21 to release the connection of the feeding circuit 22 to the subscriber 11 and connect the level converter 23 to the subscriber line 11. Though the level converter 23 is connected to the subscriber line 11, no transmission of the ordinary voice band signal is performed, thereby naturally producing no ill effect on the corresponding transmission.

Figure 2:
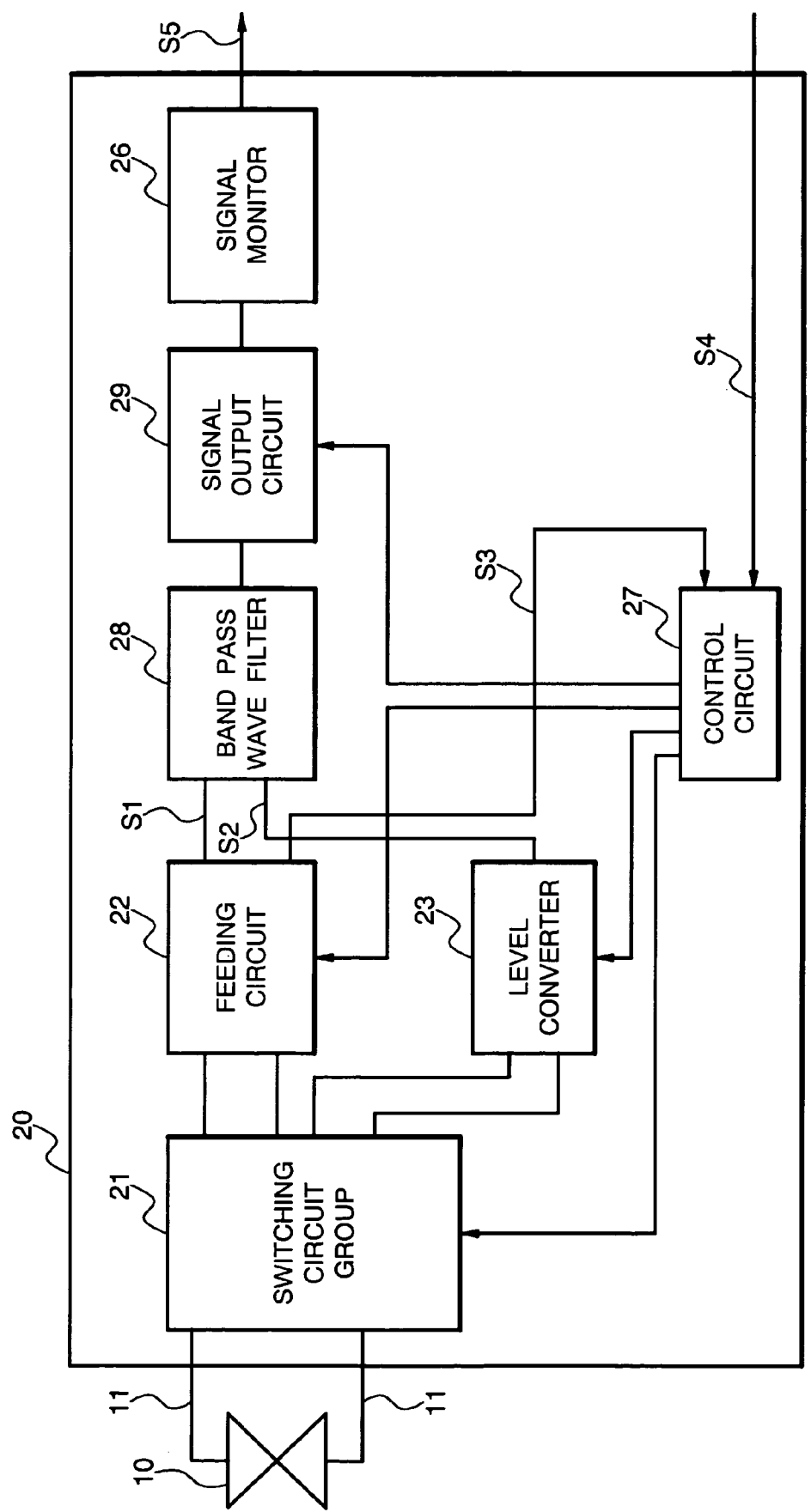
FIG. 2 is a block diagram showing the structure of a subscriber circuit according to another embodiment of the present invention.

FIG. 2 is a block diagram showing the structure of a subscriber circuit according to another embodiment of the present invention. With reference to FIG. 2, the subscriber circuit 20 of this embodiment comprises a feeding circuit 22 for feeding the current of a call to the terminal 10 through the subscriber line 11 and monitoring the state of a loop of the subscriber line, a switching circuit group 21 for connecting the feeding circuit 22 to the subscriber line 11 and releasing the feeding circuit 22 from the subscriber line 11, a level converter 23 for converting a two-wire signal sent from the terminal 10 connected to the subscriber line through the switching circuit group 21 into a signal any coefficient-fold, a band pass wave filter 28 for receiving and filtering the signal obtained by multiplying the two-wire signal from the feeding circuit 22 by any coefficient and a level converted output signal of the level converter 23, a signal output circuit 29 for supplying one of the output signal of the feeding circuit 22 passed through the band pass wave filter 28 and the level converted output signal of the level converter 23, a signal monitor 26 for monitoring the output signal of the signal output circuit 29 and supplying the signal monitor information, and a control circuit 27 for controlling the switching circuit group 21, the feeding circuit 22, the level converter 23, and the signal output circuit 29, based on the upper control information and the output of monitoring the loop of the feeding circuit 22.

In the above components, the components other than the band pass wave filter 28 and the signal output circuit 29 are identical to those of the subscriber circuit of the first embodiment as shown in FIG. 1, thereby omitting their description. In short, the subscriber circuit of this embodiment is designed by exchanging the position of the signal output circuit 24 and the band pass wave filter 25 in the subscriber circuit of the first embodiment. FIG. 2 shows only the characteristic components of the embodiment, and the description of the other general components is omitted there.

Of the above components, the band pass wave filter 28 receives the two-wire coefficient-fold signal S1 from the feeding circuit 22 and the level converted signal S2 of the level converter 23, filters and supplies them to the signal output circuit 29.

The signal output circuit 29 receives the two-wire coefficient-fold signal S1 and the level converted signal S2 filtered through the band pass wave filter 28 and supplies one of them to the signal monitor 26.

This time, the operation of this embodiment will be described separately when the terminal 10 is off/on hook and when the feeding circuit 22 is released from the subscriber line.

At first, the description will be made when the terminal 10 is off hook. At this time, the feeding circuit 22 supplies the current of a call to the terminal 10 and supplies the loop monitoring result S3 to the control circuit 27. Further, the feeding circuit 22 converts the two-wire signal sent from the terminal 10 into the predetermined coefficient-fold one, so to supply the same to the band pass wave filter 28.

The band pass wave filter 28 filters the two-wire coefficient-fold signal S1 and supplies it to the signal output circuit 29.

The signal output circuit 29 supplies to the signal monitor 26, the two-wire coefficient-fold signal S1 supplied from the feeding circuit 22 and filtered by the band pass wave filter 28, according to the control information of the control circuit 27.

The signal monitor 26 compares the signal supplied from the signal output circuit 29 with the predetermined reference level, and when the output of the signal output circuit 29 is larger than the reference level, it supplies the signal monitor information S5.

In the above operation, the control circuit 27 permits the feeding circuit 22 to supply the current of a call to the terminal 10, and permits the switching circuit group 21 to connect the feeding circuit 22 to the subscriber line 11 as well as to release the level converter 23 from the subscriber line 11. Thus, since the level converter 23 is released from the subscriber line 11, this produces no ill effect on the transmission characteristic of an ordinary voice band signal in the terminal 10 and the two-wire coefficient-fold signal S1.

Next, the description will be made when the terminal 10 is on hook. At this time, since the current of a call is not supplied from the feeding circuit 22 to the terminal 10, the loop monitoring result S3 is not supplied to the control circuit 27. Since the feeding circuit 22 doesn't supply the current of a call to the terminal 10, it cannot convert the two-wire signal sent from the terminal 10 into the coefficient-fold one because of lack of the dynamic range.

The control circuit 27 controls the connection of the level converter 23 to the subscriber line 11.

The level converter 23 receives the two-wire signal sent from the terminal 10 through the switching circuit group 21, and supplies the level converted signal S2 obtained by multiplying it by the predetermined coefficient, to the band pass wave filter 28.

The band pass wave filter 28 filters the level converted signal S2 and supplies it to the signal output circuit 29.

The signal output circuit 29 supplies to the signal monitor 26, the level converted signal S2 supplied from the level converter 23 and filtered by the band pass wave filter 28, according to the control information from the control circuit 27.

The signal monitor 26 compares the signal supplied from the signal output circuit 29 with the predetermined reference level, and when the output of the signal output circuit 29 is larger than the reference level, it supplies the signal monitor information S5.

In the above operation, the control circuit 27 controls the switching circuit group 21 to connect the feeding circuit 22 to the subscriber line 11 and to connect the level converter 23 to the subscriber line 11. Though the level converter 23 is connected to the subscriber line 11, the terminal 10 is on hook, and no transmission of the ordinary voice band signal is performed, thereby naturally producing no ill effect on the corresponding transmission.

This time, the description will be made when the feeding circuit 22 stops feeding the current of a call and the switching circuit group 21 releases the feeding circuit 22 from the subscriber line 11. At this time, the loop monitoring result S3 is not supplied from the feeding circuit 22 to the control circuit 27.

Since the feeding circuit 22 is in a state of no feeding of the call current and released from the subscriber line 11, it cannot convert the two-wire signal sent from the terminal 10 into the coefficient-fold one.

The control circuit 27 controls the connection of the level converter 23 to the subscriber line 11.

The level converter 23 receives the two-wire signal sent from the terminal 10 through the switching circuit group 21, and supplies the level converted signal S2 obtained by multiplying it by the predetermined coefficient, to the band pass wave filter 28.

The band pass wave filter 28 filters the level converted signal S2 and supplies it to the signal output circuit 29.

The signal output circuit 29 supplies to the signal monitor 26, the level converted signal S2 supplied from the level converter 23 and filtered by the band pass wave filter 28, according to the control information from the control circuit 27.

The signal monitor 26 compares the signal supplied from the signal output circuit 29 with the predetermined reference level, and when the output of the signal output circuit 29 is larger than the reference level, it supplies the signal monitor information S5.

In the above operation, the control circuit 27 controls the feeding circuit 22 to stop feeding the current of a call to the terminal 10, and controls the switching circuit group 21 to release the connection of the feeding circuit 22 to the subscriber 11 and connect the level converter 23 to the subscriber line 11. Though the level converter 23 is connected to the subscriber line 11, no transmission of the ordinary voice band signal is performed, thereby naturally producing no ill effect on the corresponding transmission.

As mentioned above, although the present invention has been described by way of example of preferred embodiments, the present invention is not necessarily limited to the form of the above embodiments.

As set forth hereinabove, in the subscriber circuit of the present invention, the feeding circuit monitors the state of a loop of a subscriber line, and monitors a signal by level-converting the two-wire signal of a subscriber line during a call. Therefore, it is not necessary to provide a device for the exclusive use for detecting the state of a hook of a subscriber line, such as a high input impedance dc buffer and a hook detecting device, thereby down-sizing the system and improving the economies.

Further, it is not necessary for the present invention to provide a high input impedance dc buffer, thereby preventing from such ill effects that the level is deviated in a call, echoes are increased, and the like.

Further, even when the feeding circuit stops feeding, and even when the feeding circuit is cut off from the subscriber line, the present invention can monitor a signal of a subscriber line by use of the level converter.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A subscriber circuit, provided with a feeding circuit for feeding current of a call to a terminal through a subscriber line and a switching circuit group for connecting the feeding circuit to the subscriber line and releasing the feeding circuit from the subscriber line, for controlling feeding to the terminal, comprising:

said feeding circuit monitoring state of a loop of the subscriber line, converting a two-wire signal sent from the terminal into a first signal predetermined coefficient-fold, and outputting the first signal predetermined coefficient-fold;

a level converter, connected to the subscriber line through said switching circuit group, which converts a two-wire signal sent from the terminal into a second signal predetermined coefficient-fold and outputs the second signal predetermined coefficient-fold, separately from said feeding circuit;

a signal output circuit which receives the output signal of said feeding circuit and the output signal of said level converter and which outputs one of the signals, a wave filter which filters the output signal of said signal output circuit, a signal monitor which monitors a signal based on the output signal of said wave filter and supplies signal monitor information, and a control circuit which controls connection and disconnection by said switching circuit group, output of said feeding circuit, output of said level converter, and operation of said signal output circuit, depending on the operation, according to upper control information and the loop monitoring output of said feeding circuit, wherein said control circuit connects said feeding circuit to said switching circuit group and connects said level converter to said switching circuit group when said terminal is in an on-hook state, and wherein said control circuit connects said feeding circuit and said switching circuit group and disconnects said level converter from said switching circuit group when said terminal is in an off-hook state, and wherein loop monitoring information provided by said feeding circuit is not provided to said control circuit when said feeding circuit is disconnected from said switching circuit group.

2. A subscriber circuit as claimed in claim 1, wherein said feeding circuit is formed by a transistor.

3. A subscriber circuit as claimed in claim 1, wherein said level converter is formed by a converter.

4. A subscriber circuit as claimed in claim 1, wherein said feeding circuit is formed by a transistor, and said level converter is formed by a converter.

5. A subscriber circuit, provided with a feeding circuit for feeding current of a call to a terminal through a subscriber line and a switching circuit group for connecting the feeding circuit to the subscriber line and releasing the feeding circuit from the subscriber line, for controlling feeding to the terminal, comprising:

said feeding circuit monitoring state of a loop of the subscriber line, converting a two-wire signal sent from the terminal into a first signal predetermined coefficient-fold, and outputting the first signal predetermined coefficient-fold;

a level converter, connected to the subscriber line through said switching circuit group, which converts a two-wire signal sent from the terminal into a second signal predetermined coefficient-fold and outputs the second signal predetermined coefficient-fold, separately from said feeding circuit;

a wave filter which filters the output signal of said feeding circuit and the output signal of said level converter;

a signal output circuit which receives the output signal of said feeding circuit and the output signal of said level converter filtered through said wave filter, and which outputs one of the signals;

a signal monitor which monitors a signal according to the output signal of said signal output circuit and supplies the signal monitor information; and a control circuit which controls connection and disconnection by said switching circuit group, output of said feeding circuit, output of said level converter, and operation of said signal output circuit, depending on the operation, according to upper control information and the loop monitoring output of said feeding circuit, wherein said control circuit connects said feeding circuit to said switching circuit group and connects said level converter to said switching circuit group when said terminal is in an on-hook state, and wherein said control circuit connects said feeding circuit and said switching circuit group and disconnects said level converter from said switching circuit group when said terminal is in an off-hook state, and wherein loop monitoring information provided by said feeding circuit is not provided to said control circuit when said feeding circuit is disconnected from said switching circuit group.

6. A subscriber circuit as claimed in claim 5, wherein said feeding circuit is formed by a transistor.

7. A subscriber circuit as claimed in claim 5, wherein said level converter is formed by a converter.

8. A subscriber circuit as claimed in claim 5, wherein said feeding circuit is formed by a transistor, and said level converter is formed by a converter.

* * * * *